(12) United States Patent
Forstrom et al.

(10) Patent No.: US 11,318,684 B2
(45) Date of Patent: May 3, 2022

(54) FLUID-FILLED CUSHIONING ARTICLE WITH SEAMLESS SIDE WALLS AND METHOD OF MANUFACTURING

(71) Applicant: NIKE, Inc., Beaverton, OR (US)

(72) Inventors: Stuart C. Forstrom, Beaverton, OR (US); David M. Forland, Battle Ground, WA (US)

(73) Assignee: NIKE, Inc., Beaverton, OR (US)

( * ) Notice: Subject to any disclaimer, the term of this patent is extended or adjusted under 35 U.S.C. 154(b) by 316 days.

(21) Appl. No.: 16/426,111

(22) Filed: May 30, 2019

(65) Prior Publication Data
US 2019/0365037 A1 Dec. 5, 2019

Related U.S. Application Data

(60) Provisional application No. 62/678,504, filed on May 31, 2018.

(51) Int. Cl.
*B29C 65/34* (2006.01)
*B32B 7/05* (2019.01)
(Continued)

(52) U.S. Cl.
CPC .......... *B29C 65/3452* (2013.01); *A43B 13/20* (2013.01); *B29D 35/142* (2013.01);
(Continued)

(58) Field of Classification Search
CPC ............ B29C 65/3444; B29C 65/3452; B29C 65/3484; B29C 65/3644; B29C 65/3652; B29C 65/3684; B32B 1/00; B32B 1/02; B32B 7/05; B32B 27/08; B32B 27/306; B32B 27/40; B32B 2307/7242; B32B 2437/02; A43B 13/00; A43B 13/14;
(Continued)

(56) References Cited

U.S. PATENT DOCUMENTS 2,677,906 A 5/1954 Reed
2,748,401 A 6/1956 Winstead
(Continued)

FOREIGN PATENT DOCUMENTS

CN 1731942 A 2/2006
CN 101072520 A 11/2007
(Continued)

*Primary Examiner* — Walter Aughenbaugh
(74) *Attorney, Agent, or Firm* — Quinn IP Law

(57) ABSTRACT

A method of manufacturing a cushioning article comprises wrapping a polymeric sheet around a support so that the polymeric sheet surrounds a perimeter of the support. A first portion of the polymeric sheet adjacent a first side edge of the polymeric sheet overlaps and is stacked on a second portion of the polymeric sheet adjacent a second side edge of the polymeric sheet. The first portion is welded to the second portion at a first weld disposed between the first side edge and the second side edge while the polymeric sheet is wrapped around the support so that the polymeric sheet forms an open-ended sheath with a top wall, a bottom wall, a first side wall and a second side wall with the first weld disposed at only one of the top wall and the bottom wall. A cushioning article manufactured according to the method is disclosed.

12 Claims, 10 Drawing Sheets

(51) Int. Cl.
  *A43B 13/20* (2006.01)
  *B29D 35/14* (2010.01)
  *B32B 1/00* (2006.01)
  *B32B 27/08* (2006.01)
  *B32B 27/30* (2006.01)
  *B32B 27/40* (2006.01)
  *B32B 1/02* (2006.01)

(52) U.S. Cl.
  CPC ............... *B32B 1/00* (2013.01); *B32B 1/02* (2013.01); *B32B 7/05* (2019.01); *B32B 27/08* (2013.01); *B32B 27/306* (2013.01); *B32B 27/40* (2013.01); *B32B 2307/7242* (2013.01); *B32B 2437/02* (2013.01)

(58) Field of Classification Search
  CPC ....... A43B 13/18; A43B 13/20; A43B 13/203; A43B 13/206; B29D 35/142
  See application file for complete search history.

(56) References Cited

U.S. PATENT DOCUMENTS

| | | | |
|---|---|---|---|
| 3,291,085 A | 12/1966 | Levy | |
| 3,431,570 A | 3/1969 | Murphy | |
| 3,475,836 A | 11/1969 | Brahm | |
| 3,556,318 A | 1/1971 | Hollis | |
| 3,593,436 A | 7/1971 | Vietas | |
| 4,183,156 A | 1/1980 | Rudy | |
| 4,219,945 A | 9/1980 | Rudy | |
| 4,367,599 A | 1/1983 | Diamant | |
| 4,809,447 A | 3/1989 | Pacanowsky et al. | |
| 4,936,029 A | 6/1990 | Rudy | |
| 5,042,176 A | 8/1991 | Rudy | |
| 5,500,067 A | 3/1996 | Jenkner | |
| 5,664,343 A | 9/1997 | Byrne | |
| 6,013,340 A | 1/2000 | Bonk et al. | |
| 6,082,025 A | 7/2000 | Bonk et al. | |
| 6,119,371 A | 9/2000 | Goodwin et al. | |
| 6,127,026 A | 10/2000 | Bonk et al. | |
| 6,203,868 B1 | 3/2001 | Bonk et al. | |
| 6,321,465 B1 | 11/2001 | Bonk et al. | |
| 6,463,612 B1 | 10/2002 | Potter | |
| 6,524,292 B1 | 2/2003 | DiPalma et al. | |
| 6,571,490 B2 | 6/2003 | Tawney et al. | |
| 7,055,267 B2 | 6/2006 | Wilson et al. | |
| 7,244,483 B2 * | 7/2007 | Tawney | A43B 13/20 428/35.7 |
| 7,752,772 B2 | 7/2010 | Hatfield et al. | |
| 8,490,297 B2 | 7/2013 | Guerra | |
| 8,595,956 B2 | 12/2013 | Byrne | |
| 8,839,530 B2 | 9/2014 | Smith et al. | |
| 8,968,508 B2 | 3/2015 | Schindler et al. | |
| 9,072,336 B2 | 7/2015 | Borel et al. | |
| 9,119,440 B2 | 9/2015 | Lagneau et al. | |
| 9,380,837 B2 | 7/2016 | Chon et al. | |
| 9,408,773 B2 | 8/2016 | Lee | |
| 9,427,043 B2 | 8/2016 | Kodad | |
| 9,445,649 B2 | 9/2016 | Huffa et al. | |
| 9,468,258 B2 | 10/2016 | Ruiz et al. | |
| 9,474,326 B2 | 10/2016 | Langvin | |
| 2003/0163880 A1 | 9/2003 | Keidel et al. | |
| 2004/0049942 A1 | 3/2004 | Chen | |
| 2008/0016717 A1 | 1/2008 | Ruban | |
| 2008/0244934 A1 | 10/2008 | Covatch | |
| 2010/0094184 A1 | 4/2010 | Wong et al. | |
| 2010/0180466 A1 | 7/2010 | Ho | |
| 2013/0232818 A1 | 9/2013 | Wiener | |
| 2013/0232825 A1 | 9/2013 | Wiener et al. | |
| 2014/0223768 A1 | 8/2014 | Berend et al. | |
| 2015/0133991 A1 | 5/2015 | Kosiorek et al. | |
| 2015/0239592 A1 | 8/2015 | Wetsch | |
| 2015/0374070 A1 | 12/2015 | Tawney et al. | |
| 2016/0000187 A1 | 1/2016 | Chon et al. | |
| 2016/0159545 A1 | 6/2016 | Corbett et al. | |
| 2018/0064208 A1 | 3/2018 | Hurd et al. | |
| 2018/0332924 A1 | 11/2018 | Bailey et al. | |
| 2019/0365038 A1 | 12/2019 | Auyang et al. | |
| 2019/0365040 A1 | 12/2019 | Auyang et al. | |

FOREIGN PATENT DOCUMENTS

| | | |
|---|---|---|
| CN | 101917881 A | 12/2010 |
| CN | 102202537 A | 9/2011 |
| CN | 102726886 A | 10/2012 |
| CN | 105231584 A | 1/2016 |
| DE | 19641842 A1 | 4/1998 |
| EP | 1579778 A1 | 9/2005 |
| EP | 3081110 A2 | 10/2016 |
| FR | 2377166 A1 | 8/1978 |
| FR | 2958508 A1 | 10/2011 |
| GB | 1272601 A | 5/1972 |
| WO | 9209214 A1 | 6/1992 |
| WO | 0170062 A2 | 9/2001 |
| WO | 2012154360 A2 | 11/2012 |

* cited by examiner

1

FLUID-FILLED CUSHIONING ARTICLE WITH SEAMLESS SIDE WALLS AND METHOD OF MANUFACTURING

CROSS-REFERENCE TO RELATED APPLICATIONS

This application claims the benefit of priority to U.S. Provisional Application No. 62/678,504, filed May 31, 2018 which is incorporated by reference in its entirety.

TECHNICAL FIELD

The present teachings generally relate to a cushioning article and a method of manufacturing a cushioning article.

BACKGROUND

Fluid-filled bladders used for cushioning in footwear or other articles provide the advantage of lightweight cushioning and resiliency. Those skilled in the footwear arts strive to simplify manufacturing methods while providing repeatability, reliability, and aesthetically pleasing cushioning articles.

DESCRIPTION

Figure 1:
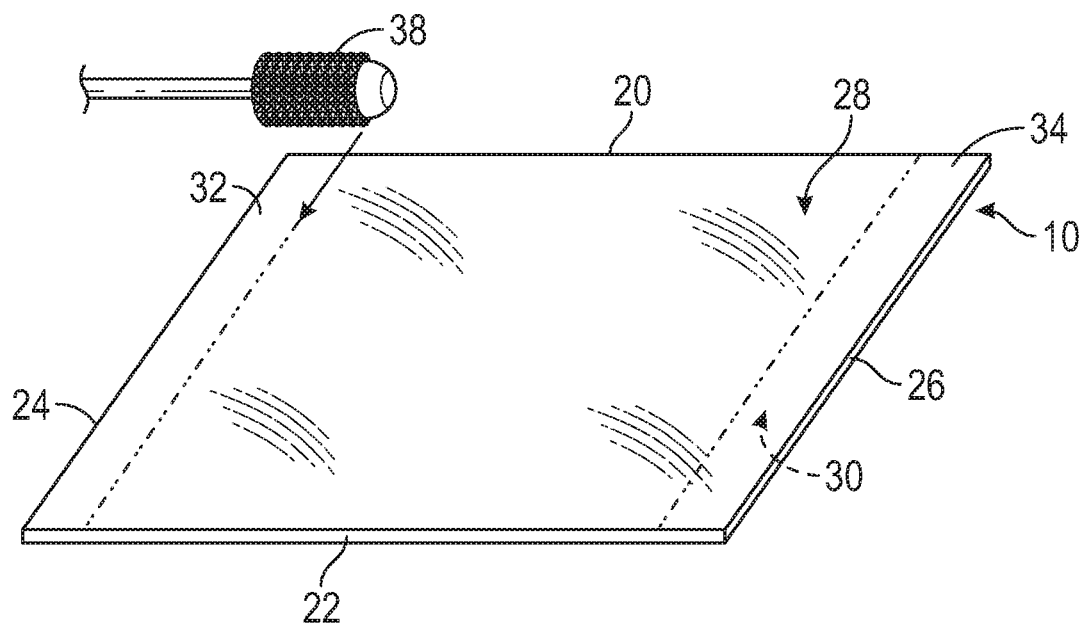
FIG. 1 is a schematic perspective view of a polymeric sheet and a knurling tool.

Cushioning articles that includes sealed, fluid-filled bladders made from sheets of multi-layer polymeric films are typically welded or thermoformed. The multiple layers may include one or more gas barrier layers that retain the fluid in the bladder. Because the multiple layers are welded or thermoformed to provide the desired shape of the bladder, weld seams typically are disposed at the periphery of the bladder. If the bladder is exposed for viewing when assembled in the article, it may be more aesthetically pleasing to view a portion of the bladder without weld seams, but it can be difficult to locate the weld seams so that they will not show.

A method of manufacturing disclosed herein provides a cushioning article that has side walls that are free from any weld seams. The method of manufacturing a cushioning article comprises wrapping a polymeric sheet around a support so that the polymeric sheet surrounds a perimeter of the support. A first portion of the polymeric sheet adjacent a first side edge of the polymeric sheet overlaps and is stacked on a second portion of the polymeric sheet adjacent a second side edge of the polymeric sheet. The method includes welding the first portion to the second portion at a first weld disposed between the first side edge and the second side edge while the polymeric sheet is wrapped around the support so that the polymeric sheet forms an open-ended sheath with a top wall, a bottom wall, a first side wall and a second side wall with the first weld disposed at only one of the top wall and the bottom wall. The polymeric sheet is then removed from the support, and, after removing the polymeric sheet from the support, the top wall is welded to the bottom wall at a first transverse weld and a second transverse weld. Both the first transverse weld and the second transverse weld cross the first weld and extend from the first side wall to the second side wall so that the polymeric sheet defines and encloses an interior cavity capable of retaining a fluid, and the first side wall and the second side wall are weld-free.

The method may include, prior to removing the polymeric sheet from the support, welding the first portion to the second portion at a second weld that is disposed between the first side edge and the second side edge and is spaced apart from the first weld. Welding the first weld may be contemporaneous with welding the second weld.

The method may include, prior to welding the first weld, knurling at least one of the first portion of the polymeric sheet and the second portion of the polymeric sheet. Knurling one or both portions helps roughen the surface of the polymeric sheet, which may enable a stronger weld seam.

The first side edge and the second side edge may both extend from a first edge of the polymeric sheet to a second edge of the polymeric sheet. The method may further comprise, contemporaneously with welding the first transverse weld, welding a first outer weld between the first transverse weld and the first edge. The first outer weld may extend from the first side wall to the second side wall, and the polymeric sheet may form a flange extending outward from the first transverse weld to the first outer weld, with the flange having a recess between the first transverse weld and the first outer weld.

Similarly, the method may further comprise, contemporaneously with welding the second transverse weld, welding a second outer weld between the second transverse weld and the second edge. The second outer weld may extend from the first side wall to the second side wall. The polymeric sheet may form a flange extending outward from the second transverse weld to the second outer weld, with the flange having a recess between the second transverse weld and the second outer weld.

The method may further comprise, after welding the polymeric sheet at the first transverse weld and the second transverse weld, trimming the polymeric sheet at the first edge, at the second edge, or at both the first edge and the second edge. Additionally, the method may include inflating the interior cavity with the fluid and sealing the interior cavity such that the interior cavity retains the fluid.

In one or more embodiments, the method may further comprise welding the top wall to the bottom wall at an intermediate weld that extends across the first weld and terminates inward of each of the first side wall, the second side wall, the first transverse weld, and the second transverse weld. Welding the top wall to the bottom wall at the intermediate weld may be contemporaneous with welding the polymeric sheet at the first transverse weld and the second transverse weld. By securing the top wall to the bottom wall between the side walls, the intermediate welds control the maximum height of the bladder when the bladder is inflated, helping it to stay flatter than it would otherwise.

In one or more embodiments, the method may further comprise disposing the cushioning article in a footwear sole structure, wherein the footwear sole structure is configured with an opening, and at least one of the first side wall and the second side wall is positioned at the opening. Because the welds are located at the top wall or the bottom wall and not at either of the side walls, no welds will extend across the opening, and the weld-free surface of one of the side walls may be viewable at the opening.

Within the scope of the disclosure a cushioning article comprises a polymeric sheet having a first portion overlapped with a second portion and welded to the second portion at a first weld, the first portion adjacent a first side edge of the polymeric sheet and the second portion adjacent a second side edge of the polymeric sheet. The polymeric sheet forms a top wall, a bottom wall, a first side wall, and a second side wall. The first side wall and the second side wall extend between the top wall and the bottom wall, and the first weld is disposed at only one of the top wall or the bottom wall. The polymeric sheet has a first transverse weld at which the top wall is welded to the bottom wall and a second transverse weld at which the top wall is welded to the bottom wall. Both the first transverse weld and the second transverse weld cross the first weld and extending from the first side wall to the second side wall so that the polymeric sheet defines and encloses an interior cavity capable of retaining a fluid, and the first side wall and the second side wall are weld-free.

In one or more embodiments, the cushioning article may include a second weld at which the first portion is welded to the second portion, the second weld disposed between the first side edge and the second side edge and spaced apart from the first weld.

In one or more embodiments of the cushioning article, the first side edge and the second side edge both extend from a first edge of the polymeric sheet to a second edge of the polymeric sheet, and a first outer weld is between the first transverse weld and the first edge and extends from the first side wall to the second side wall. The polymeric sheet forms a flange extending outward from the first transverse weld to the first outer weld. The flange has a recess between the first transverse weld and the first outer weld.

In one or more embodiments, the cushioning article further comprises a second outer weld between the second transverse weld and the second edge and extending from the first side wall to the second side wall. The polymeric sheet forms a flange extending outward from the second transverse weld to the second outer weld. The flange has a recess between the second transverse weld and the second outer weld.

In one or more embodiments, the cushioning article further comprises an intermediate weld securing the top wall to the bottom wall and that extends across the first weld and terminates inward of each of the first side wall, the second side wall, the first transverse weld, and the second transverse weld.

In one or more embodiments of the cushioning article, the polymeric sheet comprises a multi-layer polymeric sheet. The multi-layer polymeric sheet may be a laminate membrane having at least a first layer comprising a thermoplastic polyurethane, and at least a second layer comprising a gas barrier polymer. The gas barrier polymer may be an ethylene-vinyl alcohol copolymer.

The above features and advantages and other features and advantages of the present teachings are readily apparent from the following detailed description of the modes for carrying out the present teachings when taken in connection with the accompanying drawings.

Cushioning articles that includes sealed, fluid-filled bladders made from sheets of multi-layer polymeric films are typically welded or thermoformed. The multiple layers may include one or more gas barrier layers that retain the fluid in the bladder. Because the multiple layers are welded or thermoformed to provide the desired shape of the bladder, weld seams typically are disposed at the periphery of the bladder. If the bladder is exposed for viewing when assembled in the article, it may be more aesthetically pleasing to view a portion of the bladder without weld seams, but it can be difficult to locate the weld seams so that they will not show.

Figure 17:
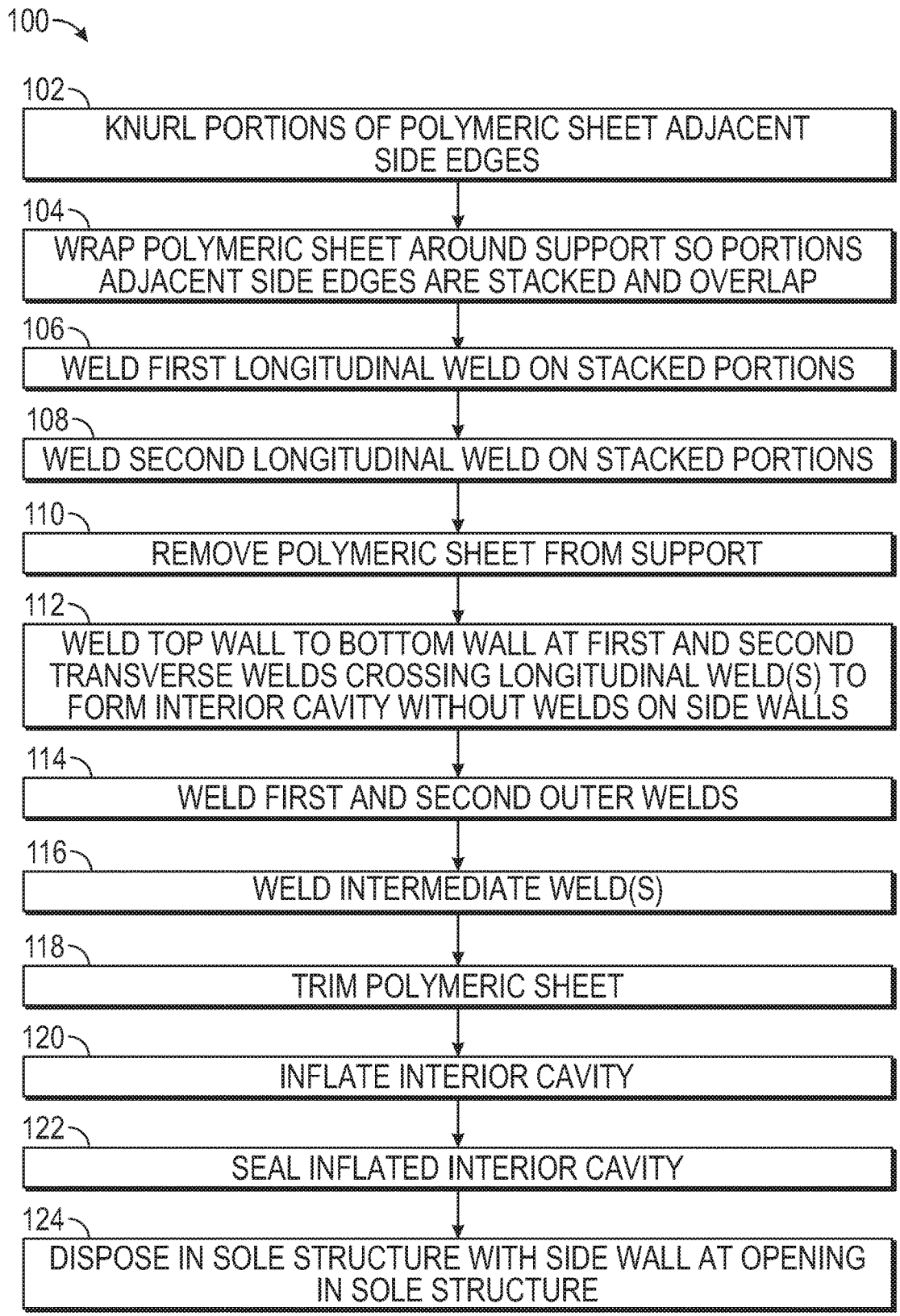
FIG. 17 is a flow diagram of a method of manufacturing a cushioning article.

A method of manufacturing 100 disclosed herein provides a cushioning article that has side walls that are free from any weld seams. Referring to the drawings, wherein like reference numbers refer to like components, FIG. 1 shows a polymeric sheet 10 that is subjected to the method of manufacturing 100 shown in the flowchart of FIG. 17 to form a cushioning article 12 shown in FIGS. 10-11. The cushioning article 12 has no welds or seams on its side walls. This is difficult to achieve for a cushioning article that is not injection molded. The polymeric sheet 10 is a multi-layer sheet and, as such, is not conducive to injection molding. For example, the polymeric sheet 10 may be a multi-layer polymeric sheet that is a laminate membrane having at least a first layer 14 comprising a thermoplastic polyurethane, and at least a second layer 16 comprising a gas barrier polymer. In the embodiment shown, the sheet includes alternating first layers 14 and second layers 16. The sheet 10 can include any of various polymeric materials that can retain a fluid at a predetermined pressure, including a fluid that is a gas, such as air, nitrogen, or another gas. For example, the sheet 10 can include thermoplastic polymeric material, such as a urethane, polyurethane, polyester, polyester polyurethane, and/or polyether polyurethane.

Figure 12:
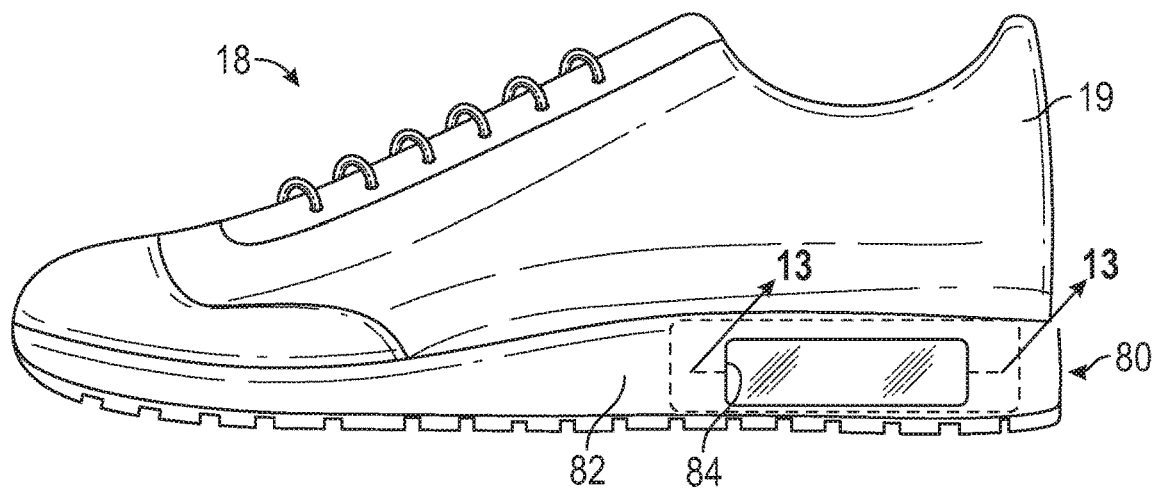
FIG. 12 is an article of footwear with the cushioning article of FIG. 11 disposed in a sole structure.
Figure 13:
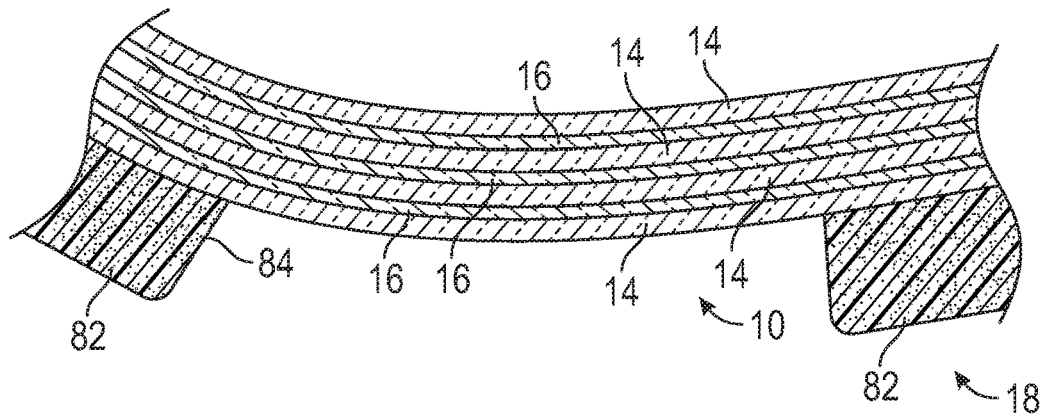
FIG. 13 is a schematic fragmentary cross-sectional view of the sole structure of FIG. 12 taken a lines 13-13 in FIG. 12.

FIG. 13, which is a close-up fragmentary cross-sectional portion of the cushioning article 12 formed from the sheet 10 in an article of footwear 18 taken at lines 13-13 in FIG. 12, shows that the polymeric sheet 10 is a laminate membrane formed from thin films having one or more first layers 14 that comprise thermoplastic polyurethane layers 14 and that alternate with one or more second layers 16, also referred to herein as barrier layers, gas barrier polymers, or gas barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. One of the first layers 14 may be arranged to form an outer surface of the polymeric sheet 10. That is, the outermost first layer 14 shown in FIG. 13 may be a portion of the outer surface of the cushioning article 12. The polymeric sheet 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The polymeric sheet 10 may also be a flexible microlayer membrane that includes alternating layers of a gas barrier polymer material such as second layers 16 and an elastomeric material such as first layers 14, as disclosed in U.S. Pat. Nos. 6,082,025 and 6,127,026 to Bonk et al. which are incorporated by reference in their entireties. Additional suitable materials for the polymeric sheet 10 are disclosed in U.S. Pat. Nos. 4,183,156 and 4,219,945 to Rudy which are incorporated by reference in their entireties. Further suitable materials for the polymeric sheet 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the polymeric sheet 10, engineering properties such as tensile strength, stretch properties, fatigue characteristics, dynamic modulus, and loss tangent can be considered. The thickness of the polymeric sheet 10 used to form the cushioning article 12 can be selected to provide these characteristics.

Referring again to FIG. 1, the polymeric sheet 10 begins in a flat, planar configuration, and has a first edge 20, a second edge 22, a first side edge 24, and a second side edge 26. In FIG. 1, the side of the sheet 10 facing upward is the inner side of the surface of the cushioning article 12 when manufactured according to the method 100, and so the surface facing upward in FIG. 1 is referred to as the inner surface 28. The surface 30 on the opposite side is the outer surface when the cushioning article 12 is manufactured according to the method 100 and is therefore referred to as the outer surface 30.

The method 100 begins with step 102, in which portions of the polymeric sheet 10 are knurled in preparation for subsequent welding. More specifically, the polymeric sheet 10 has a first portion 32 adjacent the first side edge 24 and a second portion 34 adjacent the second side edge 26. The portions 32, 34 are shown extending from the respective side edges 24, 26 to phantom lines parallel with the side edge. A knurling tool 38 is used to knurl the portions 32, 34. At least the inner surface 28 at the first portion 32 and the outer surface 30 at the second portion 34 are knurled, although the portions 32, 34 may each be knurled at both surfaces 28, 30.

Figure 2:
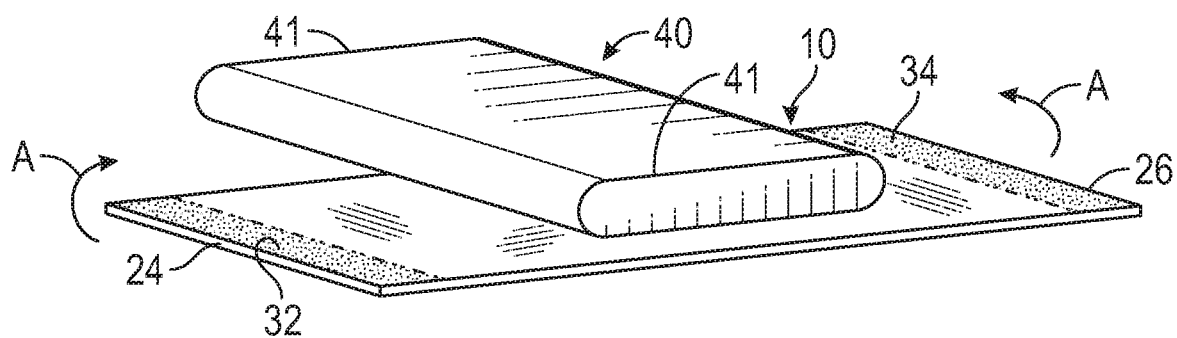
FIG. 2 is a schematic perspective view of the polymeric sheet of FIG. 1 and a support.
Figure 3:
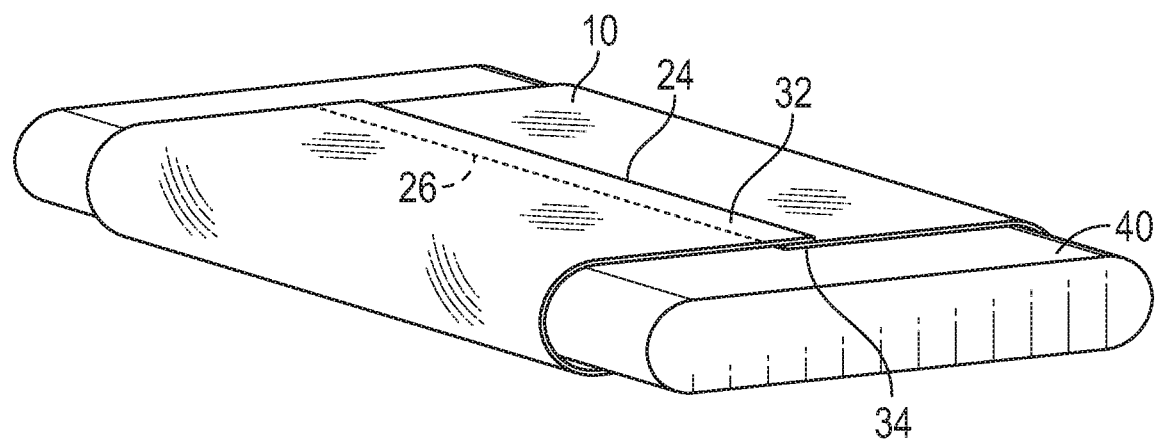
FIG. 3 is a schematic perspective view of the polymeric sheet of FIG. 2 wrapped around the support of FIG. 2.

The method 100 then proceeds to step 104, wrapping the polymeric sheet 10 around a support 40 so that the polymeric sheet 10 surrounds a perimeter 41 of the support 40, and so that the first portion 32 of the polymeric sheet 10 overlaps and is stacked on the second portion 34 of the polymeric sheet 10. Wrapping the polymeric sheet 10 around the support 40 is depicted in FIGS. 2 and 3. In FIG. 2, the polymeric sheet 10 is generally centered under the support 40, and the side edges 24, 26 are moved upward and around the support 40, as indicated by arrows A in FIG. 2, until the second portion 34 rests on the support 40, and the first portion 32 overlaps and rests on the second portion 34 as shown in FIG. 3. In this arrangement, the knurled inner surface 28 at the first portion 32 lays against the knurled outer surface 30 at the second portion 34.

With the polymeric sheet wrapped on the support 40 as shown in FIG. 3, the method 100 proceeds to step 106, in which a first longitudinal weld W1 (also referred to herein as a first weld or a first weld seam) welds the first portion 32 to the second portion 34. Because one or both of the portions 32, 34 are knurled, the material of the sheet 10 may bond together at the weld W1 more strongly than if the surfaces were smoother.

The method 100 may include step 108, in which, prior to removing the polymeric sheet 10 from the support 40, the first portion 32 is also welded to the second portion 34 at a second weld W2 that is disposed between the first side edge 24 and the second side edge 26 and is spaced apart from the first weld W1. Welding the first weld W1 may be contemporaneous with welding the second weld W2, as each may be welded using the same welding tool 42. The first and second welds W1, W2 are parallel with one another and with the first and second side edges 24, 26. The first and second welds W1, W2 extend from the first edge 20 to the second edge 22.

Figure 4:
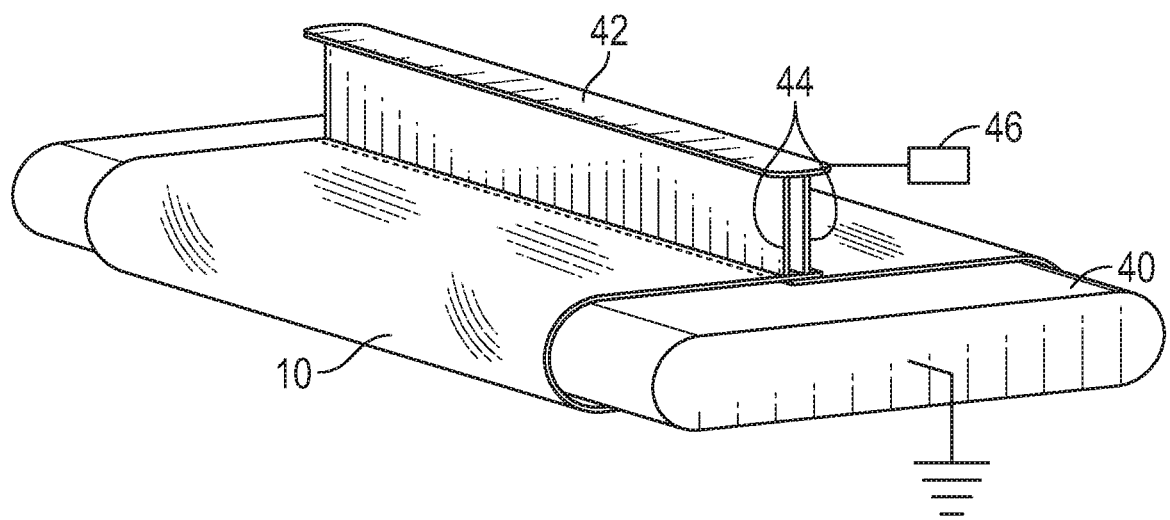
FIG. 4 is a schematic perspective view of the polymeric sheet and support of FIG. 2 and a first welding tool.

FIG. 4 shows a welding tool 42 used to create the first weld W1 and the second weld W2. Two parallel protrusions 44 of the welding tool 42 create the welds W1, W2 when the welding tool 42 is powered by a power source 46 to provide power for radio frequency welding (also referred to as high frequency or dielectric welding) of the first portion 32 to the second portion 34. The power source 46 supplies energy creating an alternating electric field that heats the polymeric sheet 10 at the overlapping portions 32, 34 where the protrusions 44 are applied to the polymeric sheet 10. Alternatively, the portions 32, 34 may be secured to one another by another manner of thermal or adhesive bonding.

Figure 5:
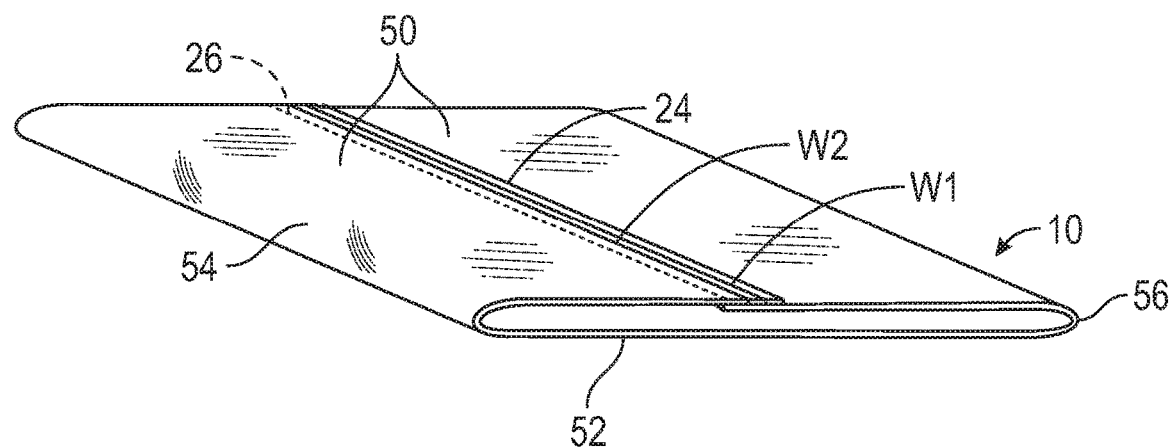
FIG. 5 is a schematic perspective view of the polymeric sheet removed from the tool after welding with the first welding tool of FIG. 4.

After step 108, the method 100 proceeds to step 110 in which the polymeric sheet 10 is removed from the support 40. Due to the first and second welds W1, W2, the polymeric sheet 10 forms an open-ended sheath, best shown in FIG. 5, with a top wall 50, a bottom wall 52, a first side wall 54, and a second side wall 56. The first side wall 54 and the second side wall 56 extend between the top wall 50 and the bottom wall 52. The flexible polymeric sheet 10 may almost flatten at the side walls 54, 56 in the state following step 108. The polymeric sheet 10 may be referred to as being folded at the side walls 54, 56. However, there are no creases at the side walls 54, 56, but the flexible nature of the polymeric sheet 10 allows it to change direction from the bottom wall to the top wall along the side walls 54, 56 without creasing.

Because the polymeric sheet 10 is wrapped around the support 40 during welding, the opposite side of the polymeric sheet 10 is protected from the welding tool 42 by the support 40 and is unaffected by the welding of the first weld W1 and the second weld W2. The first weld W1 and the second weld W2 are disposed at only the top wall 50. If the polymeric sheet 10 is instead wrapped around the support 40 from above and welded at a lower side of the support 40, then the first weld W1 and the second weld W2 would be disposed only at the bottom wall 52.

Figure 7:
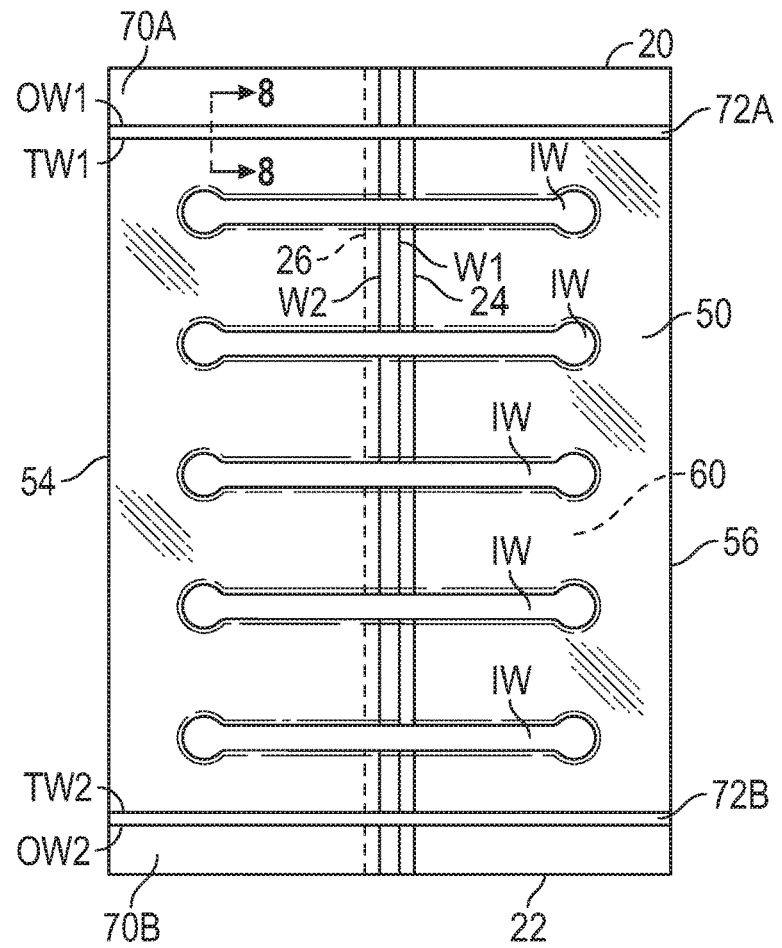
FIG. 7 is a schematic top view of the polymeric sheet of FIG. 6 after welding with the second welding tool.
Figure 10:
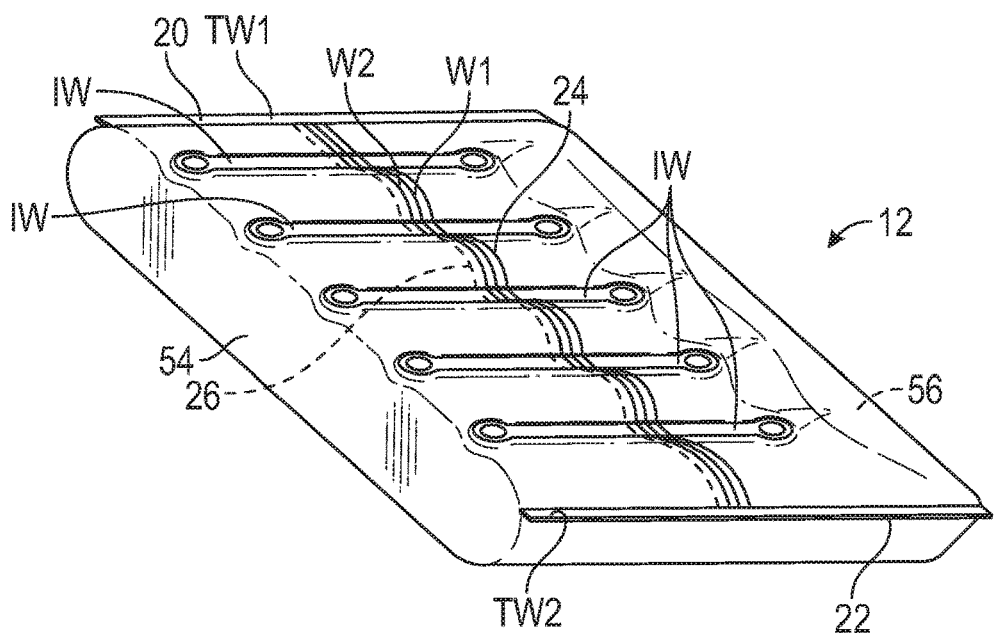
FIG. 10 is a schematic perspective view of the welded polymeric sheet of FIG. 9 after inflating to form a cushioning article and shows the first side wall.
Figure 11:
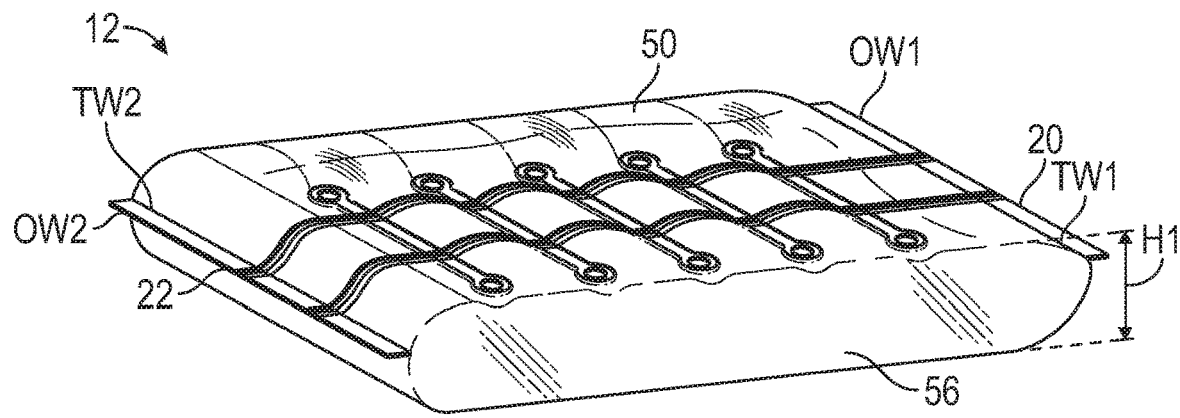
FIG. 11 is a schematic perspective view of the welded polymeric sheet of FIG. 9 after inflating to form the cushioning article and shows the second side wall.

With the polymeric sheet 10 now removed from the support 40, the method proceeds to step 112, in which the top wall 50 is welded to the bottom wall 52 at a first transverse weld TW1 and a second transverse weld TW2, shown in FIG. 7. Both the first transverse weld TW1 and the second transverse weld TW2 cross the first weld W1 and the second weld W2 and extend from the first side wall 54 to the second side wall 56. This causes the polymeric sheet 10 to define and encloses an interior cavity 60 capable of retaining a fluid, while leaving the first side wall 54 and the second side wall 56 weld-free, as best shown in FIGS. 10 and 11.

Figure 6:
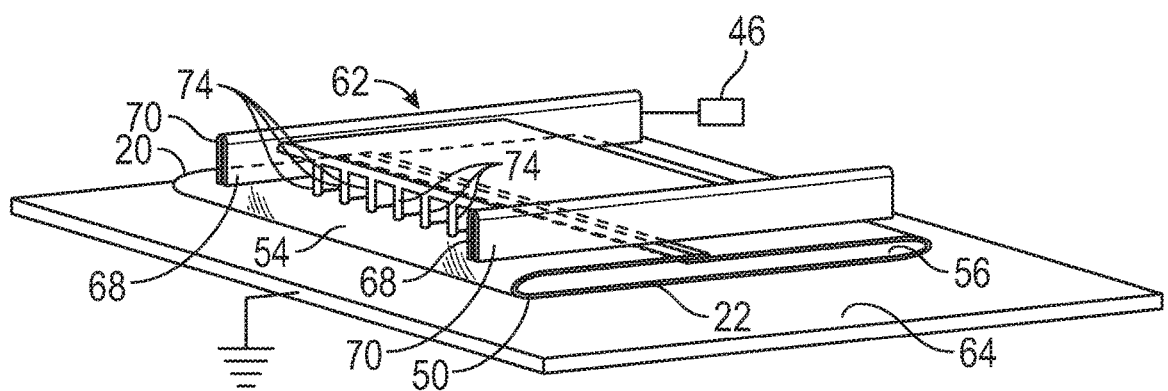
FIG. 6 is a schematic perspective view of the polymeric sheet of FIG. 5 and a second welding tool.

FIG. 6 shows a welding tool 62 used to create the first transverse weld TW1 and the second transverse weld TW2. The polymeric sheet 10 is placed on a welding table 64 and the welding tool 62 is powered by the power source 46 to provide power for radio frequency welding or are secured by another manner of thermal or adhesive bonding. The power source 46 supplies energy creating an alternating electric field that heats the polymeric sheet 10 at the stacked top and bottom walls 50, 52 where two parallel protrusions 68 of the welding tool 62 are applied to the top wall 50 to create the welds TW1, TW2. The entire cushioning article 12 is formed from the single polymeric sheet 10.

Figure 8:
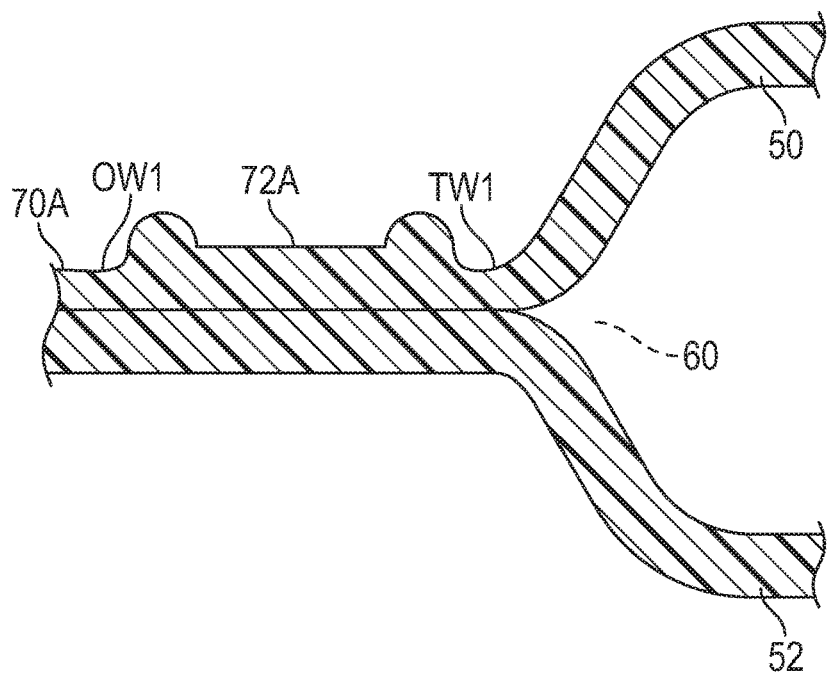
FIG. 8 is a schematic fragmentary cross-sectional view of the welded polymeric sheet of FIG. 7 taken a lines 8-8 in FIG. 7.

Because the welding tool 62 has additional protrusions, the method 100 may further comprise step 114 which may occur contemporaneously with welding the first transverse weld TW1 and the second transverse weld TW2, and includes welding a first outer weld OW1 between the first transverse weld TW1 and the first edge 20, and welding a second outer weld OW2 between the second transverse weld TW2 and the second edge 22. More specifically, the parallel protrusions 70 are spaced from one another and from the protrusions 68, further toward first and second edges 20, 22. Like the transverse welds TW1, TW2, the first outer welds OW1 and OW2 cross the first and second longitudinal welds W1 and W2, and extend from the first side wall 54 to the second side wall 56. The polymeric sheet 10 forms a flange 70A extending outward from the first transverse weld TW1 to the first outer weld OW1 and outward to first edge 20. The polymeric sheet 10 also forms a flange 70B extending outward from the first transverse weld TW2 to the first outer weld OW2 and outward to the second edge 22. As best shown in FIG. 8, the flange 70A has a recess 72A between the first transverse weld TW1 and the first outer weld OW1. Flange 70B has a similar recess 72B between the second transverse weld TW2 and the second outer weld OW2. The first transverse weld TW1 and the first outer weld OW1 serve as a double seal of the interior cavity 60 near the first edge 20, and the second transverse weld TW2 and the second outer weld OW2 serve as a double seal of the interior cavity 60 near the second edge 22. Stated differently, the outer welds OW1 and OW2 provide redundant sealing of the interior cavity 60. The recesses 72A and 72B may serve as guides at which the cushioning article 12 may be secured to other components with which it is subsequently assembled, such as a midsole, and upper, etc.

In addition to the transverse welds TW1 and TW2 and the outer welds OW1 and OW2, the method 100 may further comprise step 116, welding the top wall 50 to the bottom wall 52 at one or more intermediate welds IW that extends across the first weld W1 and the second weld W1 and terminate inward of each of the first side wall 54, the second side wall 56, the first transverse weld TW1, and the second transverse weld TW2. The intermediate welds IW thus do not create sub-chambers within the interior cavity 60. Step 116, welding the top wall 50 to the bottom wall 52 at the one or more intermediate welds IW may be contemporaneous with step 112, welding the polymeric sheet at the first transverse weld TW1 and the second transverse weld TW2, and contemporaneous with step 114, welding the first outer weld OW1 and the second outer weld OW2. As shown in FIG. 6, the welding tool 62 includes protrusions 74 that are parallel with and spaced from one another, and are also parallel with and spaced from the protrusions 68, 70 and are generally thicker and shorter than the protrusions 68 and 70. The protrusions 74 do not extend to the side walls 54, 56, but extend across the longitudinal welds W1 and W2. The protrusions 74 result in intermediate welds IW shown in FIG. 7 that secure the top wall 50 to the bottom wall 52 and the ability of the top control the maximum height H1 of the cushioning article 12 when the cushioning article 12 is inflated, as shown in FIG. 11, helping it to stay flatter than it would otherwise.

Figure 9:
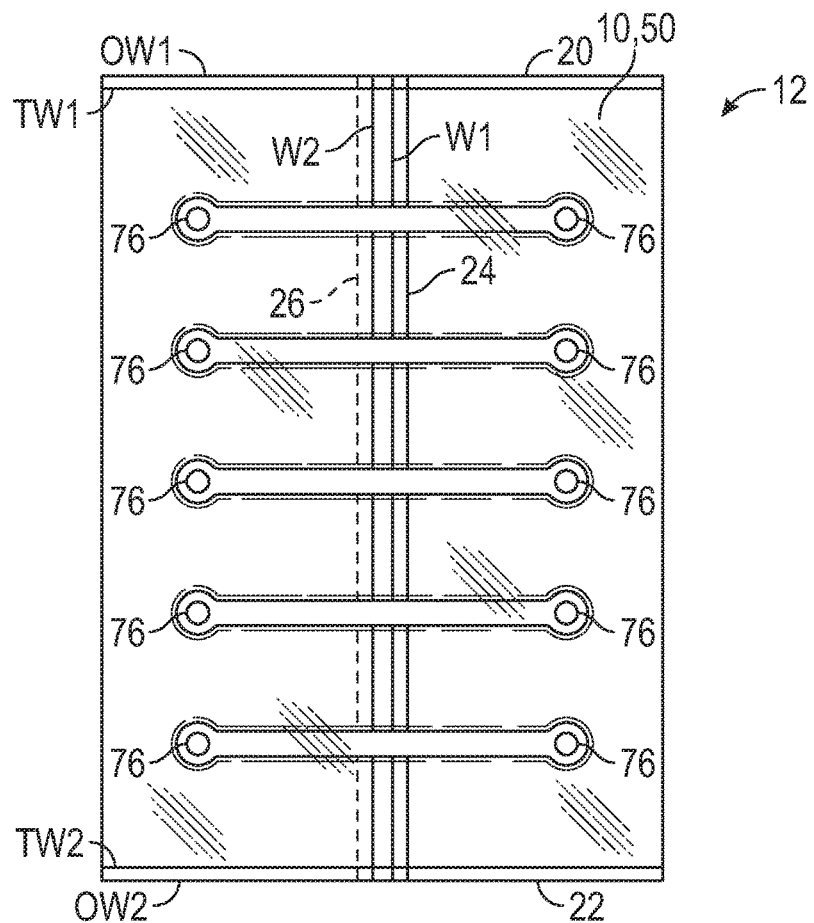
FIG. 9 is a schematic top view of the welded polymeric sheet of FIG. 7 after trimming.

The method 100 may further comprise, step 118, which occurs after welding the polymeric sheet at the first transverse weld and the second transverse weld, and includes trimming the polymeric sheet 10 at the first edge 20, at the second edge 22, or at both the first edge and the second edge. The trimming occurs between the outward weld OW1 and the first edge 20, and between the outward weld OW2 and the second edge 22 and OW2. The trimming step is best illustrated in FIG. 9, where the polymeric sheet 10 has been trimmed to the outward welds OW1 and OW2. Apertures 76 have also been punched or otherwise provided at ends of each of the intermediate welds IW, as shown in FIG. 9. After trimming in step 118, the method 100 proceeds to step 120 in which the interior cavity is inflated by filling it with a gas or air to a predetermined pressure. Inflation may occur through an inflation port (not shown) at either flange 70A or 70B provided by a short fill tube laid between the top wall and the bottom wall where the welding tool 62 forms the transverse weld TW1 or TW2 and the corresponding outward weld OW1 or OW2. Alternatively, step 120 can be omitted if the interior cavity 60 is to be at ambient pressure. The inflated interior cavity 60 is subsequently sealed in step 122, such as by sealing the plug.

If the cushioning article 12 is for an article of footwear, the method 100 may move from step 122 to step 124, in which the cushioning article is disposed in a sole structure 80 of the article of footwear 18 of FIG. 12. The sole structure 80 is secured to a footwear upper 19. The sole structure 80 has a midsole 82 that is configured with an opening 84, as best illustrated in the cross-section of FIG. 13. Either the first side wall 54 or the second side wall 56 is positioned at the opening 84, depending on the configuration. In the embodiment shown, the first side wall 54 is positioned at the opening 84 so that it is visible through the opening from the exterior of the article of footwear 18. As is evident in FIG. 12, because the welds (including longitudinal welds W1, W2, transverse welds TW1, TW2, and outer welds OW1, OW2), are located at the top wall 50 or the bottom wall 52 and not at either of the side walls 54, 56, no welds will extend across the opening 84, and the weld-free surface of the side wall 54 is viewable at the opening 84.

Figure 14:
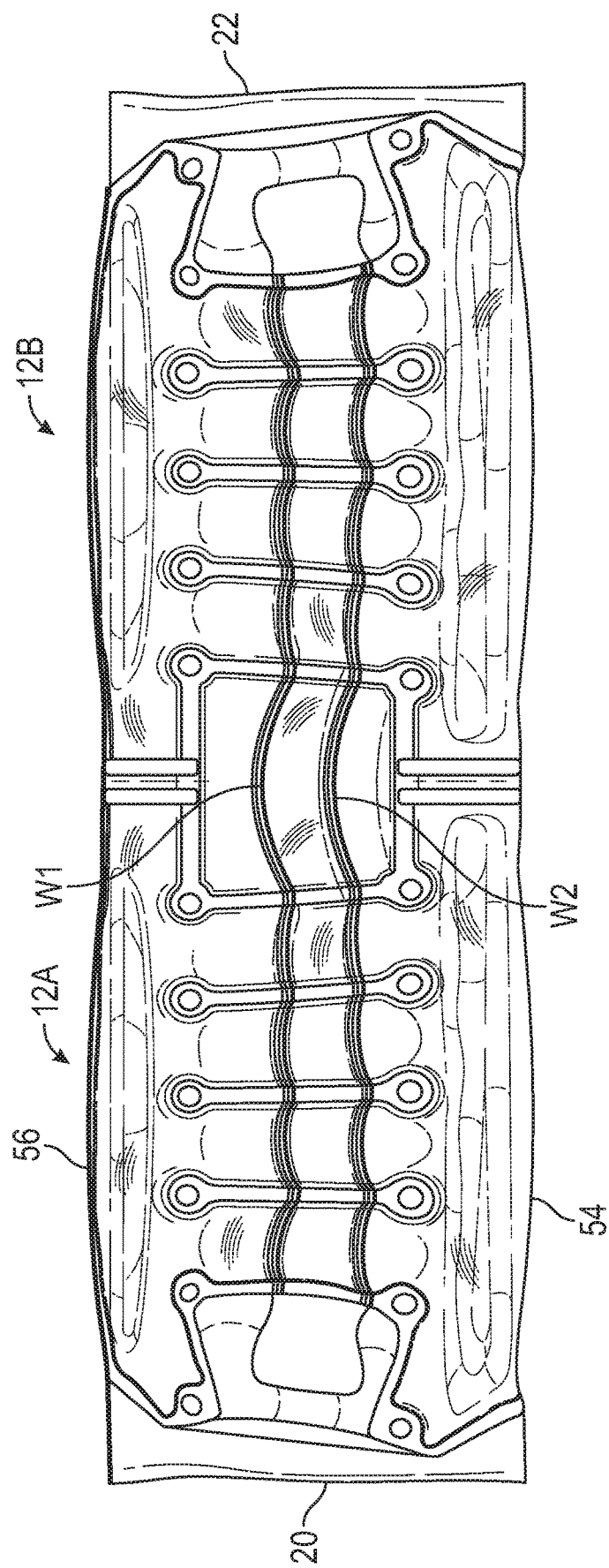
FIG. 14 is a schematic top perspective view of a single sheet welded to form multiple cushioning articles.
Figure 15:
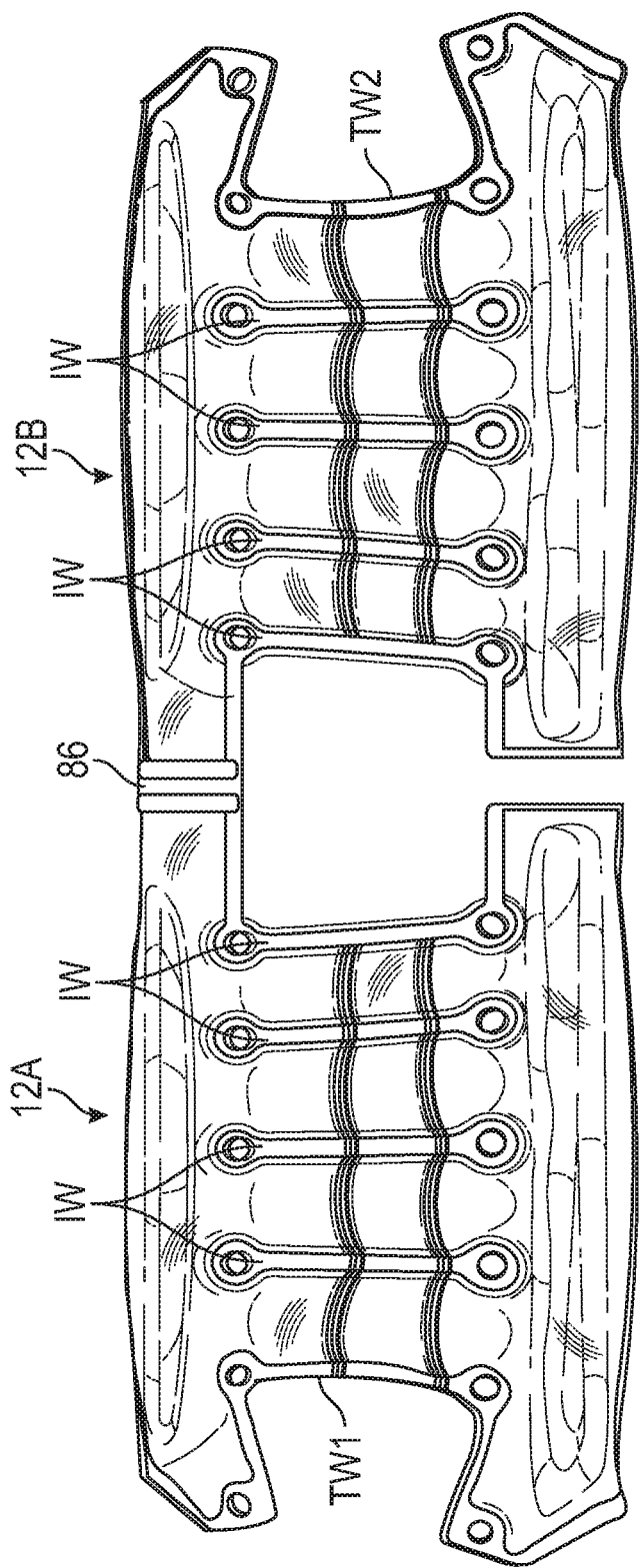
FIG. 15 is a schematic top perspective view of the welded sheet of FIG. 14 after trimming.
Figure 16:
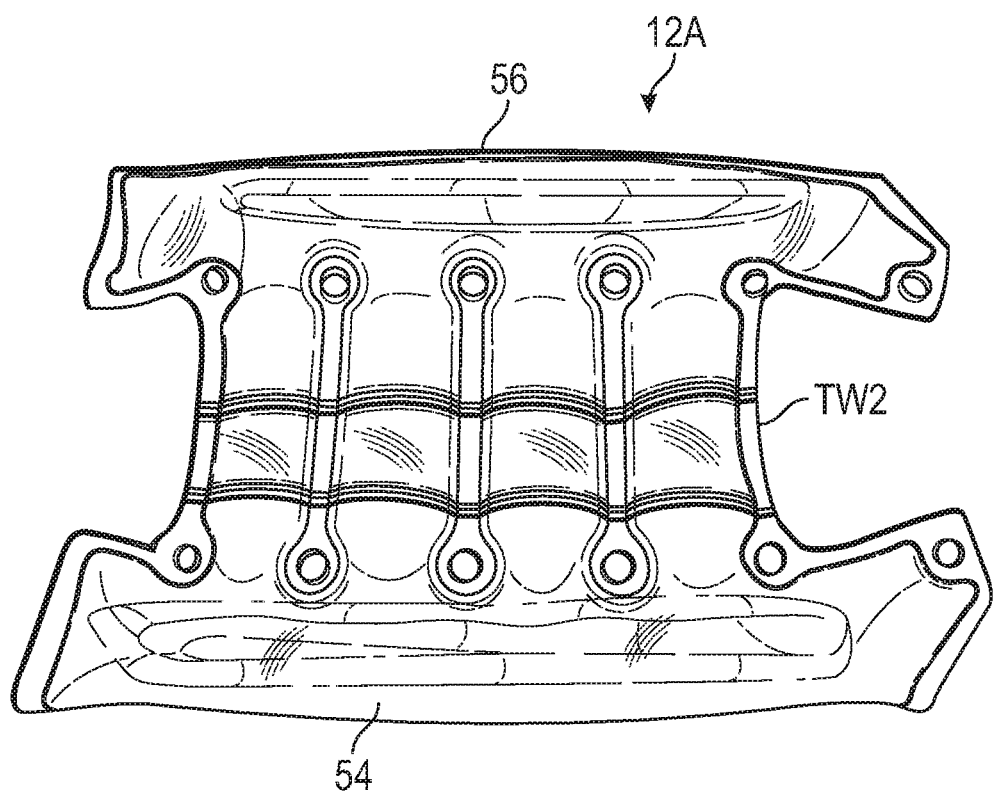
FIG. 16 is a schematic top perspective view of one of the cushioning articles of FIG. 15.

FIGS. 14-16 illustrate that multiple cushioning articles 12 may be manufactured from the same single polymeric sheet 10, according to the same method 100. Two identical cushioning articles referred to as cushioning articles 12A and 12B are formed according to the same steps described with respect to method 100. The first and second longitudinal welds W1 and W2 extend through both of the cushioning articles 12A and 12B. The welding tool used has a different pattern of protrusions, and the transverse welds that result near the first edge 20 and the second edge 22 are nonlinear. The polymeric sheet 10 is turned 90 degrees relative to FIG. 1 in FIG. 14. Excess polymeric material between the first edge 20 and the first transverse weld W1, between the second edge 22 and the second transverse weld W2, and between some of the interior welds IW is trimmed, as shown in FIG. 15. The two cushioning articles 12A, 12B may be doubled over at a welded joint 86 at which they are connected or may be separated by cutting at the joint to provide two disjoined cushioning articles, one of which (cushioning article 12B) is shown in FIG. 16. Neither of the cushioning articles 12A, 12B have any welds along the side walls 54, 56.

The following Clauses provide example configurations of a cushioning article and a method of manufacturing a cushioning article as disclosed herein.

Clause 1: A method of manufacturing a cushioning article, the method comprising: wrapping a polymeric sheet around a support so that the polymeric sheet surrounds a perimeter of the support and a first portion of the polymeric sheet adjacent a first side edge of the polymeric sheet overlaps and is stacked on a second portion of the polymeric sheet adjacent a second side edge of the polymeric sheet; welding the first portion to the second portion at a first weld disposed between the first side edge and the second side edge while the polymeric sheet is wrapped around the support so that the polymeric sheet forms an open-ended sheath with a top wall, a bottom wall, a first side wall and a second side wall and with the first weld disposed at only one of the top wall and the bottom wall; removing the polymeric sheet from the support; and after removing the polymeric sheet from the support, welding the top wall to the bottom wall at a first transverse weld and a second transverse weld, both the first transverse weld and the second transverse weld crossing the first weld and extending from the first side wall to the second side wall so that the polymeric sheet defines and encloses an interior cavity capable of retaining a fluid, and the first side wall and the second side wall are weld-free.

Clause 2: The method of clause 1, further comprising: before removing the polymeric sheet from the support, welding the first portion to the second portion at a second weld; wherein the second weld is disposed between the first side edge and the second side edge and is spaced apart from the first weld.

Clause 3: The method of clause 2, wherein welding the first weld is contemporaneous with welding the second weld.

Clause 4: The method of any of clauses 1-3, further comprising: prior to welding the first weld, knurling at least one of the first portion of the polymeric sheet and the second portion of the polymeric sheet.

Clause 5: The method of any of clauses 1-4, wherein the first side edge and the second side edge both extend from a first edge of the polymeric sheet to a second edge of the polymeric sheet, and the method further comprising; contemporaneously with welding the first transverse weld, welding a first outer weld between the first transverse weld and the first edge, the first outer weld extending from the first side wall to the second side wall, the polymeric sheet forming a flange extending outward from the first transverse weld to the first outer weld, and the flange having a recess between the first transverse weld and the first outer weld.

Clause 6: The method of any of clauses 1-5, wherein the first side edge and the second side edge both extend from a first edge of the polymeric sheet to a second edge of the polymeric sheet, and the method further comprising: contemporaneously with welding the second transverse weld, welding a second outer weld between the second transverse weld and the second edge, the second outer weld extending from the first side wall to the second side wall, the polymeric sheet forming a flange extending outward from the second transverse weld to the second outer weld, and the flange having a recess between the second transverse weld and the second outer weld.

Clause 7: The method of any of clauses 1-6, wherein the first side edge and the second side edge both extend from a first edge of the polymeric sheet to a second edge of the polymeric sheet, and the method further comprising: after welding the polymeric sheet at the first transverse weld and the second transverse weld, trimming the polymeric sheet at the first edge, at the second edge, or at both the first edge and the second edge.

Clause 8: The method of any of clauses 1-7, further comprising: inflating the interior cavity with the fluid.

Clause 9: The method of any of clauses 1-8, further comprising: sealing the interior cavity such that the interior cavity retains the fluid.

Clause 10: The method of any of clauses 1-9, further comprising: welding the top wall to the bottom wall at an intermediate weld that extends across the first weld and terminates inward of each of the first side wall, the second side wall, the first transverse weld, and the second transverse weld.

Clause 11: The method of clause 10, wherein welding the top wall to the bottom wall at the intermediate weld is contemporaneous with welding the polymeric sheet at the first transverse weld and the second transverse weld.

Clause 12: The method of any of clauses 1-11, further comprising: disposing the cushioning article in a footwear sole structure; wherein the footwear sole structure is configured with an opening, and at least one of the first side wall and the second side wall is positioned at the opening.

Clause 13: A cushioning article comprising: a polymeric sheet having a first portion overlapped with a second portion and welded to the second portion at a first weld, the first portion adjacent a first side edge of the polymeric sheet and the second portion adjacent a second side edge of the polymeric sheet; the polymeric sheet forming a top wall, a bottom wall, a first side wall, and a second side wall, the first side wall and the second side wall extending between the top wall and the bottom wall, the first weld disposed at only one of the top wall or the bottom wall; and the polymeric sheet having a first transverse weld at which the top wall is welded to the bottom wall and a second transverse weld at which the top wall is welded to the bottom wall, both the first transverse weld and the second transverse weld crossing the first weld and extending from the first side wall to the second side wall so that the polymeric sheet defines and encloses an interior cavity capable of retaining a fluid, and the first side wall and the second side wall are weld-free.

Clause 14: The cushioning article of clause 13, further comprising: a second weld at which the first portion is welded to the second portion, the second weld disposed between the first side edge and the second side edge and spaced apart from the first weld.

Clause 15: The cushioning article of any of clauses 13-14, wherein the first side edge and the second side edge both extend from a first edge of the polymeric sheet to a second edge of the polymeric sheet, and the cushioning article further comprising: a first outer weld between the first transverse weld and the first edge and extending from the first side wall to the second side wall, the polymeric sheet forming a flange extending outward from the first transverse weld to the first outer weld, and the flange having a recess between the first transverse weld and the first outer weld.

Clause 16: The cushioning article of clause 15, further comprising: a second outer weld between the second transverse weld and the second edge and extending from the first side wall to the second side wall, the polymeric sheet forming a flange extending outward from the second transverse weld to the second outer weld, and the flange having a recess between the second transverse weld and the second outer weld.

Clause 17: The cushioning article of any of clauses 13-16, further comprising: an intermediate weld securing the top wall to the bottom wall, extending across the first weld, and terminating inward of each of the first side wall, the second side wall, the first transverse weld, and the second transverse weld.

Clause 18: The cushioning article of any of clauses 13-17, wherein the polymeric sheet comprises a multi-layer polymeric sheet.

Clause 19: The cushioning article of clause 18, wherein the multi-layer polymeric sheet is a laminate membrane having: at least a first layer comprising a thermoplastic polyurethane; and at least a second layer comprising a gas barrier polymer.

Clause 20: The cushioning article of clause 19, wherein the gas barrier polymer is an ethylene-vinyl alcohol copolymer.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of manufacturing a cushioning article, the method comprising:
    wrapping a polymeric sheet around a support so that the polymeric sheet surrounds a perimeter of the support and a first portion of the polymeric sheet adjacent a first side edge of the polymeric sheet overlaps and is stacked on a second portion of the polymeric sheet adjacent a second side edge of the polymeric sheet;
    welding the first portion to the second portion at a first weld disposed between the first side edge and the second side edge while the polymeric sheet is wrapped around the support so that the polymeric sheet forms an open-ended sheath with a top wall, a bottom wall, a first side wall and a second side wall and with the first weld disposed at only one of the top wall and the bottom wall; removing the polymeric sheet from the support; and
    after removing the polymeric sheet from the support, welding the top wall to the bottom wall at a first transverse weld and a second transverse weld, both the first transverse weld and the second transverse weld crossing the first weld and extending from the first side wall to the second side wall so that the polymeric sheet defines and encloses an interior cavity capable of retaining a fluid, and the first side wall and the second side wall are weld-free.

2. The method of claim 1, further comprising:
    before removing the polymeric sheet from the support, welding the first portion to the second portion at a second weld; wherein the second weld is disposed between the first side edge and the second side edge and is spaced apart from the first weld.

3. The method of claim 2, wherein welding the first weld is contemporaneous with welding the second weld.

4. The method of claim 1, further comprising:
    prior to welding the first weld, knurling at least one of the first portion of the polymeric sheet and the second portion of the polymeric sheet.

5. The method of claim 1, wherein the first side edge and the second side edge both extend from a first edge of the polymeric sheet to a second edge of the polymeric sheet, and the method further comprising;
    contemporaneously with welding the first transverse weld, welding a first outer weld between the first transverse weld and the first edge, the first outer weld extending from the first side wall to the second side wall, the polymeric sheet forming a flange extending outward from the first transverse weld to the first outer weld, and the flange having a recess between the first transverse weld and the first outer weld.

6. The method of claim 1, wherein the first side edge and the second side edge both extend from a first edge of the polymeric sheet to a second edge of the polymeric sheet, and the method further comprising:
    contemporaneously with welding the second transverse weld, welding a second outer weld between the second transverse weld and the second edge, the second outer weld extending from the first side wall to the second side wall, the polymeric sheet forming a flange extending outward from the second transverse weld to the second outer weld, and the flange having a recess between the second transverse weld and the second outer weld.

7. The method of claim 1, wherein the first side edge and the second side edge both extend from a first edge of the polymeric sheet to a second edge of the polymeric sheet, and the method further comprising:
    after welding the polymeric sheet at the first transverse weld and the second transverse weld, trimming the polymeric sheet the first edge, the second edge, or at both between the first edge and the second edge.

8. The method of claim 1, further comprising:
    inflating the interior cavity with the fluid.

9. The method of claim 1, further comprising:
    sealing the interior cavity such that the interior cavity retains the fluid.

10. The method of claim 1, further comprising:
    welding the top wall to the bottom wall at an intermediate weld that extends across the first weld and terminates inward of each of the first side wall, the second side wall, the first transverse weld, and the second transverse weld.

11. The method of claim 10, wherein welding the top wall to the bottom wall at the intermediate weld is contemporaneous with welding the polymeric sheet at the first transverse weld and the second transverse weld.

12. The method of claim 1, further comprising:
    disposing the cushioning article in a footwear sole structure; wherein the footwear sole structure is configured with an opening, and at least one of the first side wall and the second side wall is positioned at the opening.

* * * * *